United States Patent [19]
Saito

[11] Patent Number: 5,424,773
[45] Date of Patent: Jun. 13, 1995

[54] APPARATUS AND METHOD FOR GENERATING A PSEUDO CAMERA POSITION IMAGE FROM A PLURALITY OF VIDEO IMAGES FROM DIFFERENT CAMERA POSITIONS USING A NEURAL NETWORK

[75] Inventor: Tsutomu Saito, Shizuoka, Japan

[73] Assignee: Kawai Musical Inst. Mfg. Co., Ltd., Shizuoka, Japan

[21] Appl. No.: 187,548

[22] Filed: Jan. 28, 1994

[30] Foreign Application Priority Data

Jan. 29, 1993 [JP] Japan .................. 5-014329

[51] Int. Cl.⁶ .................. H04N 5/225; H04N 13/02
[52] U.S. Cl. .................. 348/218; 395/23; 348/50; 348/47; 326/35
[58] Field of Search .............. 348/239, 218, 46, 50; 395/21, 23, 25; 307/201; H04N 5/225, 13/02

[56] References Cited

U.S. PATENT DOCUMENTS

| | | | |
|---|---|---|---|
| 4,897,811 | 1/1990 | Scofield | 395/21 |
| 5,235,440 | 8/1993 | Clark et al. | 395/25 |
| 5,295,197 | 3/1994 | Takenaga et al. | 395/21 |

*Primary Examiner*—James J. Groody
*Assistant Examiner*—Cheryl Cohen

[57] ABSTRACT

The present invention generates a plurality of video image data of different camera positions for an object shot by a camera and modifies and synthesizes the video image data of a pseudo camera position sandwiched between the related camera angles from a plurality of video image data of the aforesaid different camera positions. By this, the video image of a pseudo camera position not actually shot can be obtained.

18 Claims, 12 Drawing Sheets

FIG. 6

| | S.W.V. TABLE | | | | | |
|---|---|---|---|---|---|---|
| | I.L. | | H.L. | | O.L. | |
| CA. (LEFT) | LA. 1 | W 1 | S.R. 1 | W 1,1<br>W 1,2<br>⋮<br>W 1,4096 | S.R. 1 | W 1,1<br>W 1,2<br>⋮<br>W 1,m |
| | LA. 2 | W 2 | S.R. 2 | W 2,1<br>W 2,2<br>⋮<br>W 2,4096 | S.R. 2 | W 2,1<br>W 2,2<br>⋮<br>W 2,m |
| | ⋮ | ⋮ | ⋮ | ⋮ | | ⋮ |
| | LA. 4096 | W 4096 | S.R. m | wm,1<br>wm,2<br>⋮<br>wm,4096 | S.R. 4096 | W 4096,1<br>W 4096,2<br>⋮<br>W 4096,m |

FIG. 11
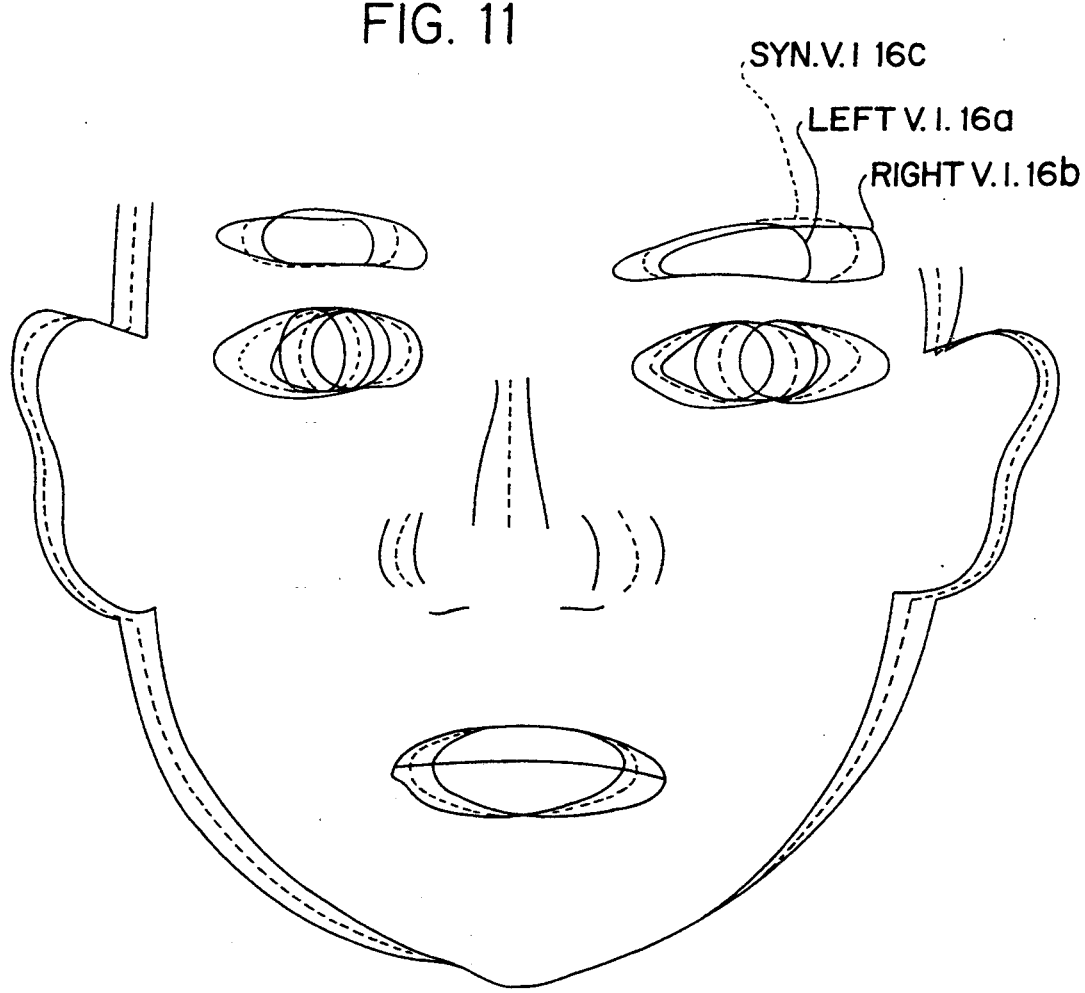
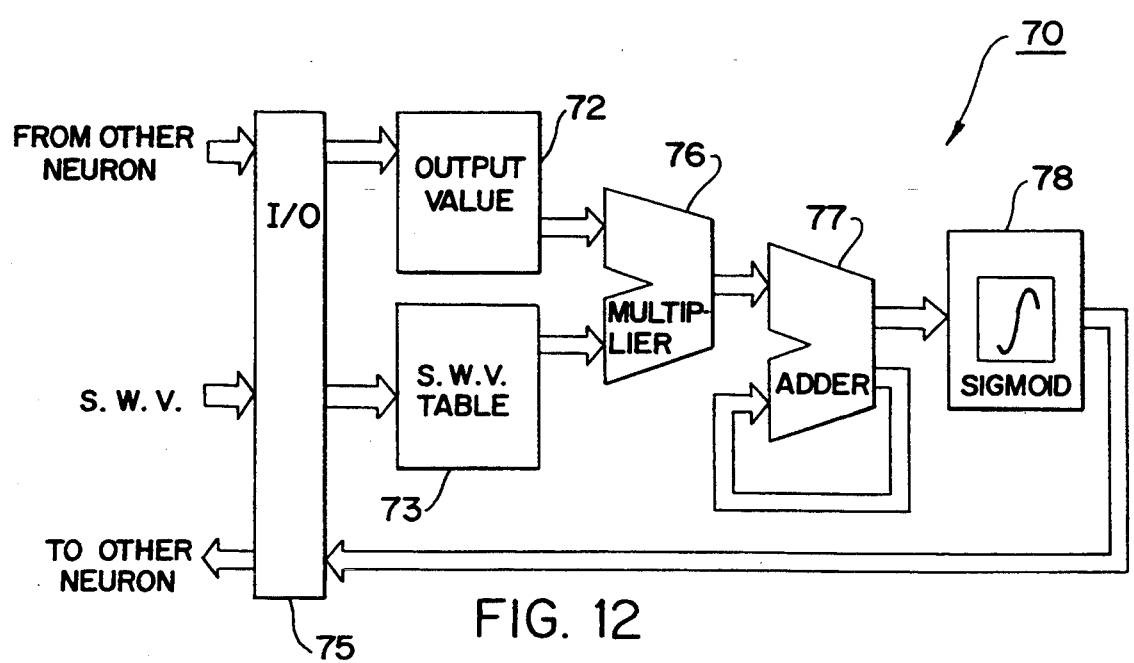
FIG. 12

APPARATUS AND METHOD FOR GENERATING A PSEUDO CAMERA POSITION IMAGE FROM A PLURALITY OF VIDEO IMAGES FROM DIFFERENT CAMERA POSITIONS USING A NEURAL NETWORK

BACKGROUND OF THE INVENTION

1. Field of the Invention

The present invention relates to an apparatus and method for combining (synthesizing) a plurality of video image data, more particularly relates to an apparatus for synthesizing video image data of a pseudo camera position from a plurality of video image data.

2. Description of the Background Art

When an announcer, etc., addresses & TV camera in a television news program, etc., the announcer is shot while reading sentences projected on a display device. Therefore, he makes an effort to focus on the words on the display screen while directing his eyes to the TV camera as much as possible. Since the TV camera is placed on the display device, the display device is not shot by the TV camera and it looks to the viewers like the announcer is directing his eyes at the TV camera.

However, if the viewers look closely, they can see that the announcer is looking at words under the TV camera and end up noticing that he is not looking at them. The same thing occurs in video telephones. The fact that the other party is speaking without looking at one's own eyes sometimes feels unnatural. Alternatively, even in a case of just shooting an object, sometimes there is a camera position at which shooting is not possible due to an obstacle, so the object cannot be shot from a specific direction.

The present invention was made so as to solve the above-mentioned problems and has as an object thereof to eliminate the deviation the lines of sight of in the case where use is made of a TV camera to which the line of sight originally should be directed and a display device to which the line of sight is actually directed and to enable shooting from a desired camera position even if an obstacle exists.

SUMMARY OF THE INVENTION

The present invention generates a plurality of video (pictorial) image data of different camera positions for an object based on the video images of the object shot by a camera and, based on coefficient data for modifying and synthesizing video image data at a pseudo camera position between the related respective camera positions from the video image data, modifies and synthesizes video image data at the aforesaid pseudo camera position from the plurality of video image data at the aforesaid different camera positions.

By this, the video image data at the camera position at which no camera exists can be synthesized, thereby enabling acquisition of video image data with matching lines of sight of the parties involved and video image data from positions from which shooting is not possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus, are not limitative of the present invention and wherein:

BRIEF DESCRIPTION OF THE DRAWINGS

FIGS. 6 are views of a synaptic weight value table;

FIG. 10C shows a turned 15 degrees to the right, respectively;

FIG. 11 is a view of a synthesized video image of a face;

FIG. 12 is a block diagram of the structure of a digital neuro chip 70; and

DESCRIPTION OF THE PREFERRED EMBODIMENTS

Summary of the Embodiment

Figure 1:
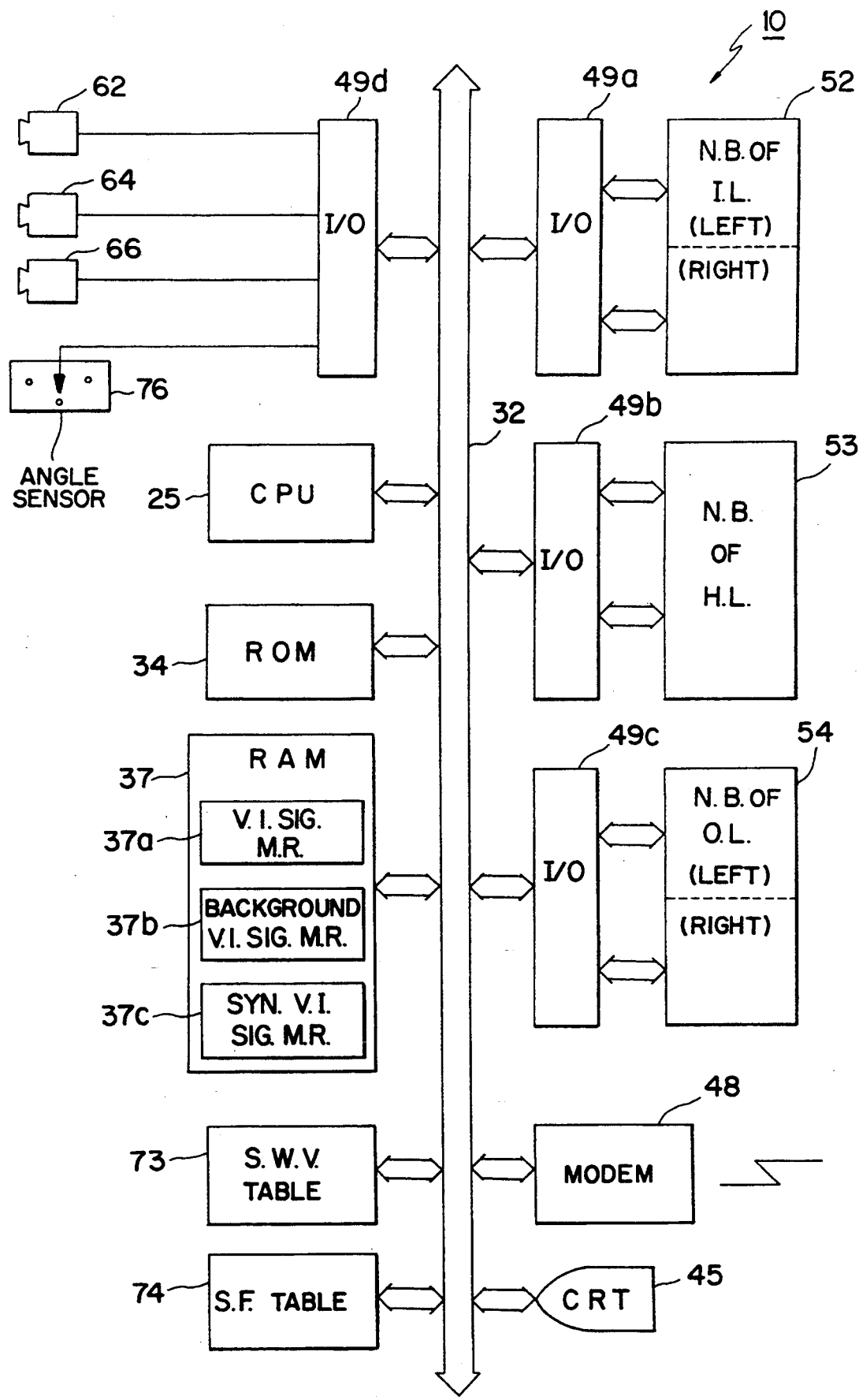
FIG. 1 is a block diagram showing the structure of a video image synthesizing apparatus 10.

Two cameras 62 and 64 are arranged at directions 15 degrees to the left and right of a board 17 with a handle serving as the object being shot. The video (pictorial) image signals of the background are removed from the video image signals A and B of the scene shot by the cameras 62 and 64. In the video image synthesizing apparatus 10, a synaptic weight value Wij of a neural network based on the back propagation method is learned using the desired output C of the camera 66 placed in front of the board 17 with the handle. The video image signals A and B from which the background was removed are modified and combined using the learned synaptic weight value Wij, and a pseudo video image of the front of the board 17 with the handle is obtained.

1. Overall Construction

FIG. 1 shows a video image synthesizing apparatus 10. The video image synthesizing apparatus 10 is mounted in a video telephone, etc., and shoots and displays the object. The video image synthesizing apparatus 10 of the present embodiment is a neural network receiving as its input the video image signals. This apparatus 10 comprises a central processing unit (CPU) 25, a read only memory (ROM) 34, a random access memory (RAM) 37, a cathode ray tube (CRT) display device 45, a modem 48, and input/output (I/O) interfaces 49a, 49b, 49c, and 49d, connected to a bus line 32 of this CPU 25. Further, a plurality of neuroboards 52, 53, and 54 and three cameras 62, 64, and 66, or an angle sensor 76 detecting the angle of the camera 66 etc., are connected via these I/O interfaces 49a, 49b, 49c, and 49d.

In the ROM 34 is stored a video image processing program to be executed by the CPU 25, corresponding to the flow chart mentioned later. A synaptic weight value table (RAM) 73 and a sigmoid function table (ROM) 74, used for this processing, are connected to the bus line 32. The RAM 37 is provided with a video image signal memory region 37a, a background signal memory region 37b, and a synthesized signal memory region 37c and stores video image signals corresponding to those regions.

2. Photographing Device

Figure 2:
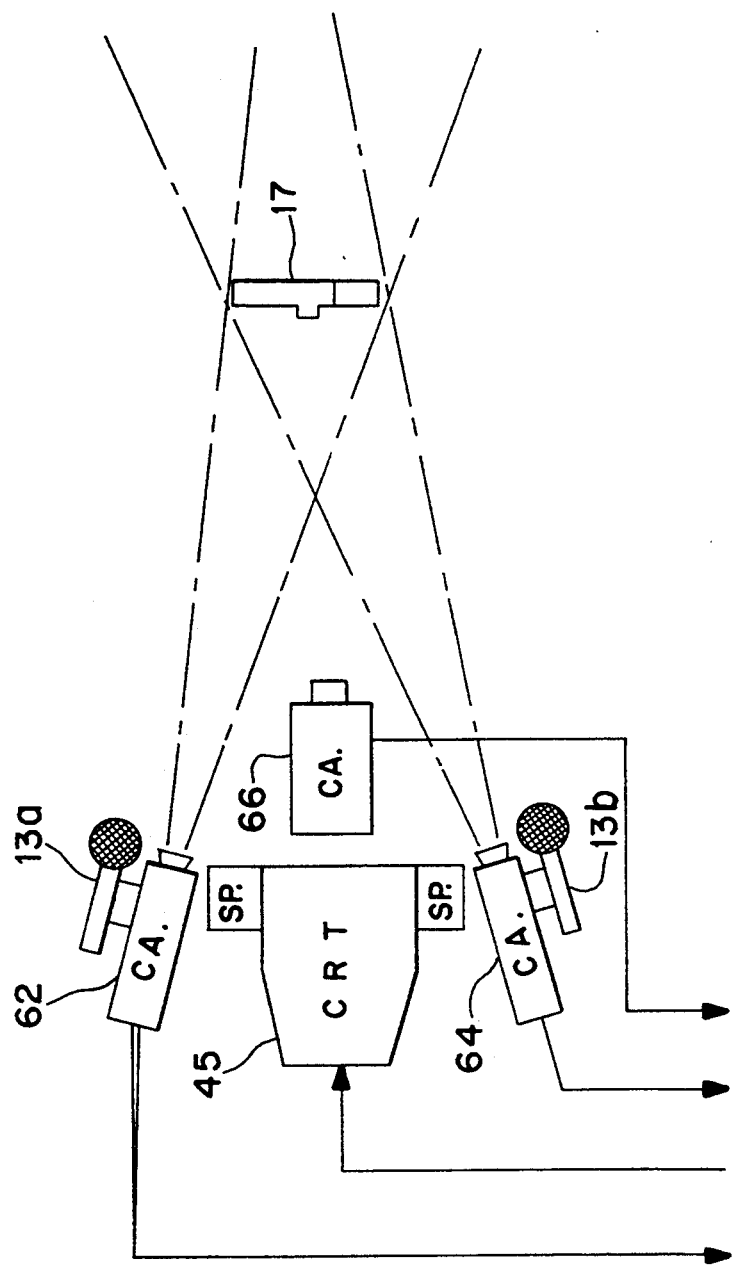
FIG. 2 is a view of a camera shooting setup.

FIG. 2 shows three cameras (photographing device) 62, 64, and 66. The cameras 62 and 64 are set respectively at camera positions 15 degrees to the left and right with respect to the board 17 with the handle which serves as the object of the shooting. The center position of the board 17 with the handle being shot is located at the intersection of the center lines of the optical systems of the cameras 62, 64, and 66. The cameras 62 and 64 include charge coupled devices (CCD). The CCD is an inter-line transfer type which converts the received (accepted) light to a signal, and outputs this video image signal in series in units of picture elements. This output is amplified by a built-in amplifier. The number n of picture elements of the CCD is 4096 picture elements in total consisting of 64 horizontal picture elements×64 vertical picture elements, so the resolution is slightly low.

Microphones 13a and 13b for recording sound simultaneously with the video image are provided in the cameras 62 and 64. Also, a CRT display device 45 is provided at an intermediate point between the cameras 62 and 64. This CRT display device 45 displays a synthesized video image signal and displays a video image signal transferred from another video image synthesizing apparatus 10 via the modem 48. Further, a camera 66 temporarily used for the learning processing mentioned later is provided forward of the CRT display device 45.

One frame's worth of each of the video image signals A, B, and C taken by these cameras 62, 64, and 66 is stored in the video image signal memory region 37a. Also, video image signals A0 and B0 taken when the object was not present are stored in the background signal memory region 37b. The synthesized video image signal is stored in the synthesized signal memory region. The pseudo camera position of the video image to be subjected to the synthesizing processing is the same in height as the positions of the cameras 62 and 64. The angle with respect to the object is either 0 degree from the front or 5 degrees to the left or right. The operator can select this. The content of the synthesizing processing are determined by this selected data and the data from an angle sensor 76. Note that, this synthesized pseudo camera position may also be a position shifted vertically or horizontally from the front and that it may or may not be sandwiched between the cameras 62 and 64.

3. Neural Network

Figure 3A:
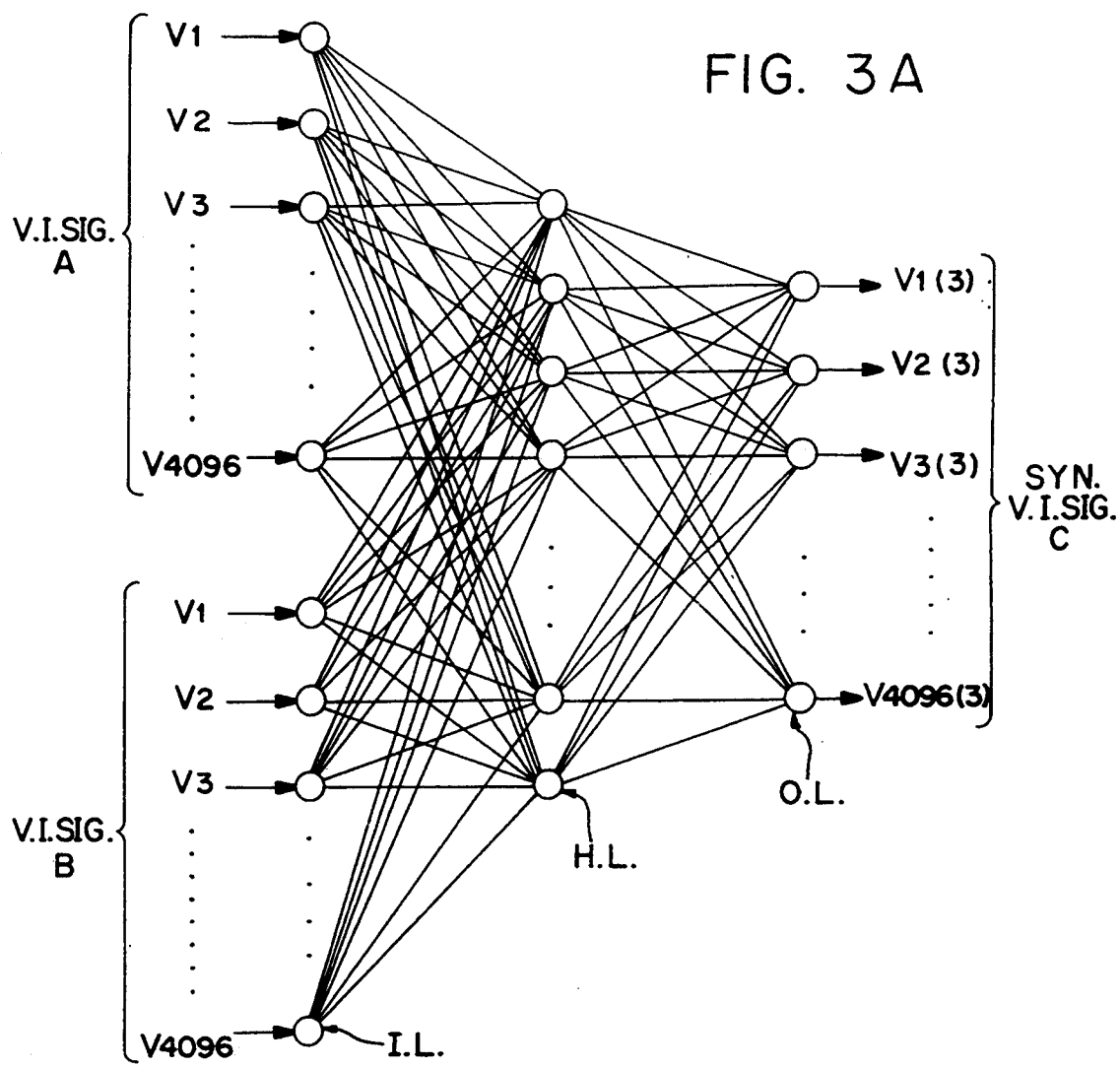
FIG. 3A shows a multi-layer type neural network.

FIG. 3A shows a model of a multi-layer type neural network used in the present embodiment. As shown in FIG. 3A, the number of the neurons of the input layer is equal to the sum 8192 of the numbers of picture elements 4096 of the CCD's of the cameras 62 and 64. The hidden layer is constituted by one or more neuron layers, the number of neurons m of the hidden layer being larger than the number of neurons of the input layer. The number of neurons of the output layer is the same as the number of picture elements of the CCD, i.e., 4096. Each neuron comprises a model shown in FIG. 3B. The neural network of the present embodiment will be explained from this model. Here, when indicating the output signal of each neuron by v, and indicating a signal subjected to a product sum operation and threshold value processing as u, the relationships among them are represented by the following equations:

$$ui(k) = \Sigma Wij(k) \times vj(k-1) - \theta i(k) \tag{3A}$$

$$vi(k) = f(ui(k)) \tag{3B}$$

Here, $\Sigma$ is a symbol indicating that the accumulation from j=1 to j=n is carried out. Wij indicates the synaptic weight value of the i-th neuron of this k layer receiving the output signal vj(k-1) from the j-th neuron of the preceding k-1 layer. n is the number of neurons of the preceding k-1 layer. $\theta i$ is the threshold value of the i-th neuron of this k layer. The function f is the input-output function of the neuron and is generally given as the next sigmoid function:

$$f = 1/\{1 + \exp(-ui(k)/\lambda)\} \tag{3C}$$

The neural network is constituted mainly by the neuro-boards 52, 53, and 54 by the operation processing of the CPU 25. The neurons of the input layer are constituted mainly by the neuro-board 52 of the 1-input type, and the neurons of the hidden layer and output layer are constituted using the multi-layer type neuro-boards 53 and 54.

4. Neuro-Boards 52, 53 and 54

Figure 4:
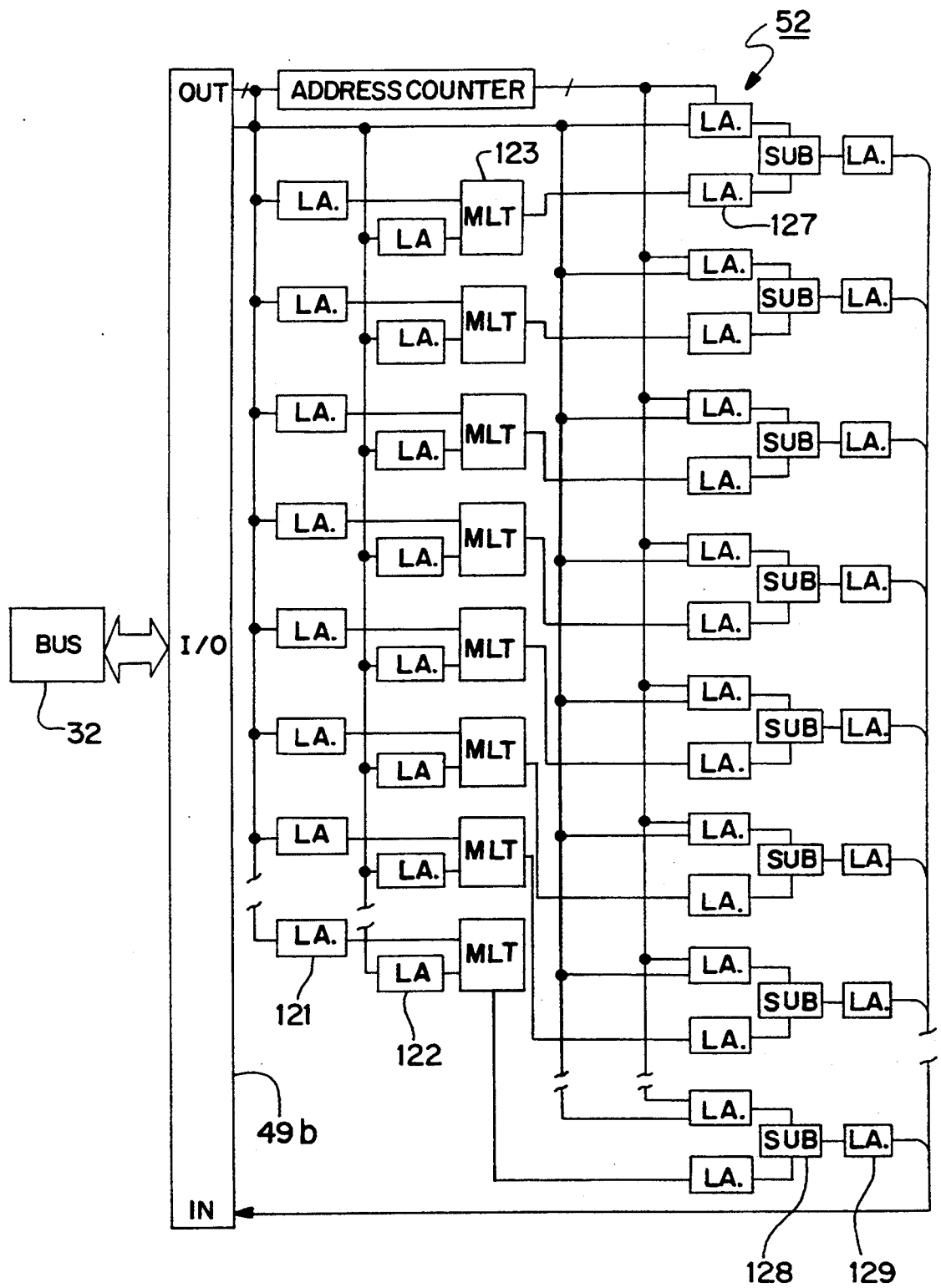
FIG. 4 is a block diagram of a neuro-board 52 of an input layer.
Figure 5:
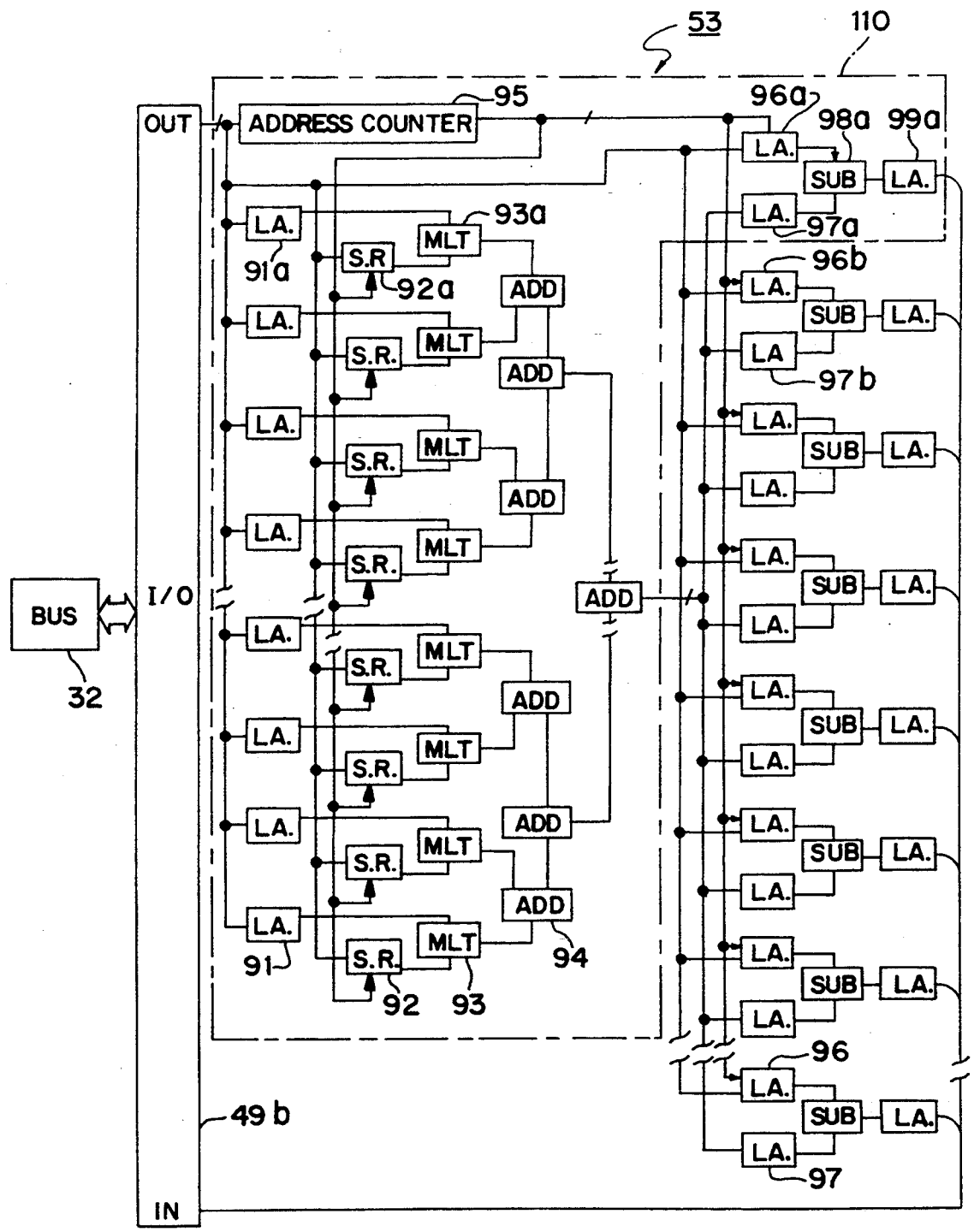
FIG. 5 is a block diagram of the neuro-board 53 of a hidden layer.

FIGS. 4 and 5 show the structures of the neuro-boards 52 and 53 of the input layer and hidden layer, respectively. The neuro-board 54 of the output layer has the same structure as that of the neuro-board 53 of the hidden layer, and therefore an explanation will be omitted. An explanation will be made at first of the neuro-board 53 of the hidden layer. The neuro-board 53 is a product sum operation circuit and comprises a latch 91, a shift register 92, a multiplier 93, and an adder 94. This circuit comprises one or more computers. It is also possible to replace the same by a digital signal processor. The video image signals of the picture elements are input to the respective latches 91, 4096×2 being mounted in parallel, via the bus line 32.

Also, the synaptic weight value Wij stored in the synaptic weight value table 73 is input to the respective shift registers 92 via the bus line 32. The synaptic weight value Wij to be input is stored as shown in FIG. 6 with 4096 pieces of data stored as a mass in one shift register 92a, for example, W1,1 to W1,4096. The data stored in the shift register 92 are sequentially shifted and output according to a shift command from an address counter 95. When the data of the output signals v1(1), v2(1), ..., vm(1) from the input layer are sequentially input to the latches 91, multiplication processings, i.e. v1(1)×W1,1, v2(1)×W1,2, ..., vm(1)×W1,m are carried out at the multipliers 93, and the values subjected to the multiplication processing are subjected to accumulation addition, that is, accumulation at the adder 94.

The value of $\Sigma$ W1,j×vj(1) ($\Sigma$ is a symbol indicating the accumulation of form j=1 to j=m) subjected to the addition processing is stored in the latch 97a of the next stage. Similarly, the value of the $\Sigma$ W2,j×vj(1) ($\Sigma$ is a symbol indicating the accumulation of from j=1 to j=m) is stored in the latch 97b. Also, the threshold value $\theta$ is stored in the ROM 34 as an inherent value for every neuron and read out and transferred to the respective latches 96 following the read out and data transferred of the aforementioned synaptic weight value Wij. By this, for example, in the latches 96a and 96b, the threshold values $\theta$ 1 and $\theta$ 2 are stored, respectively. When the subtraction processing of $\Sigma$ W1,j×vj(1)−$\theta$ 1 ($\Sigma$ is a symbol indicating the accumulation of from j=1 to j=m) is executed by the subtractor 98, the resultant data ul(2) is stored in the output latch 99a.

Figure 3B:
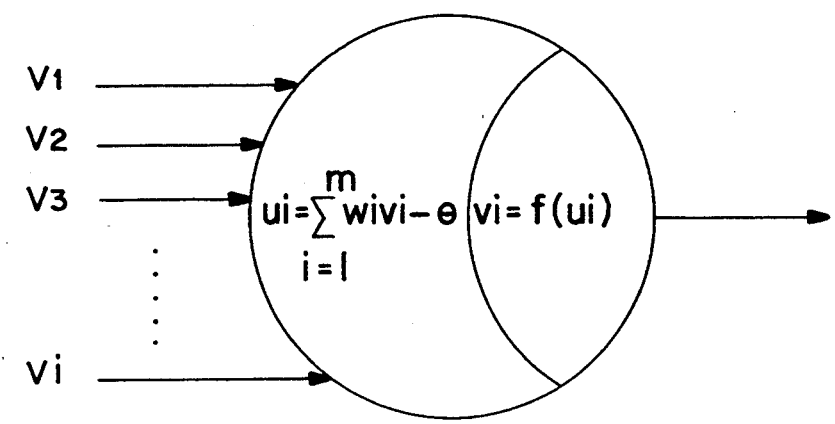
FIG. 3B is a view of a neuron.

The data ui(2) stored in each of the output latches 99 is once fetched into the RAM 37 via the I/O interface 49b and the bus line 32 in a processing division time of the CPU 25. After this, the sigmoid conversion indicated in the aforementioned equation (3C) is executed referring to the sigmoid function table 74. The operation of the neurons is ended in this way. One neuron shown in FIG. 3B is constituted by a part of the product sum operation and the threshold value processing 110 surrounded by the one dot chain line of FIG. 5 and the sigmoid function table 74.

An explanation will be made next of the neuro-board 52 of the input layer. The neuron of the input layer is single-input, and therefore the neuro-board 52 of the input layer has a structure formed by eliminating the adder 94 from the above-mentioned neuro-board 53 of the hidden layer. Namely, the output of the multiplier 123 is stored in the latch 127 as it is without addition to the output of another multiplier. Also, the data of the synaptic weight value Wij transferred from the synaptic weight value table 73 can be stored not in the shift register, but in the latch 122. Also, that data stored in the latch 122 is also W1, W2, ..., W4096. The neuron of the input layer may be plural-input. The synthesis of the video image is carried out using the above indicated neural network. First, a summary of the video image synthesis according to a relatively simple perceptron model will be shown. Next, the synthesis of the video image according to a general back propagation model will be shown.

5. Video Image Synthesizing Processing

Figures 7A, 7B:
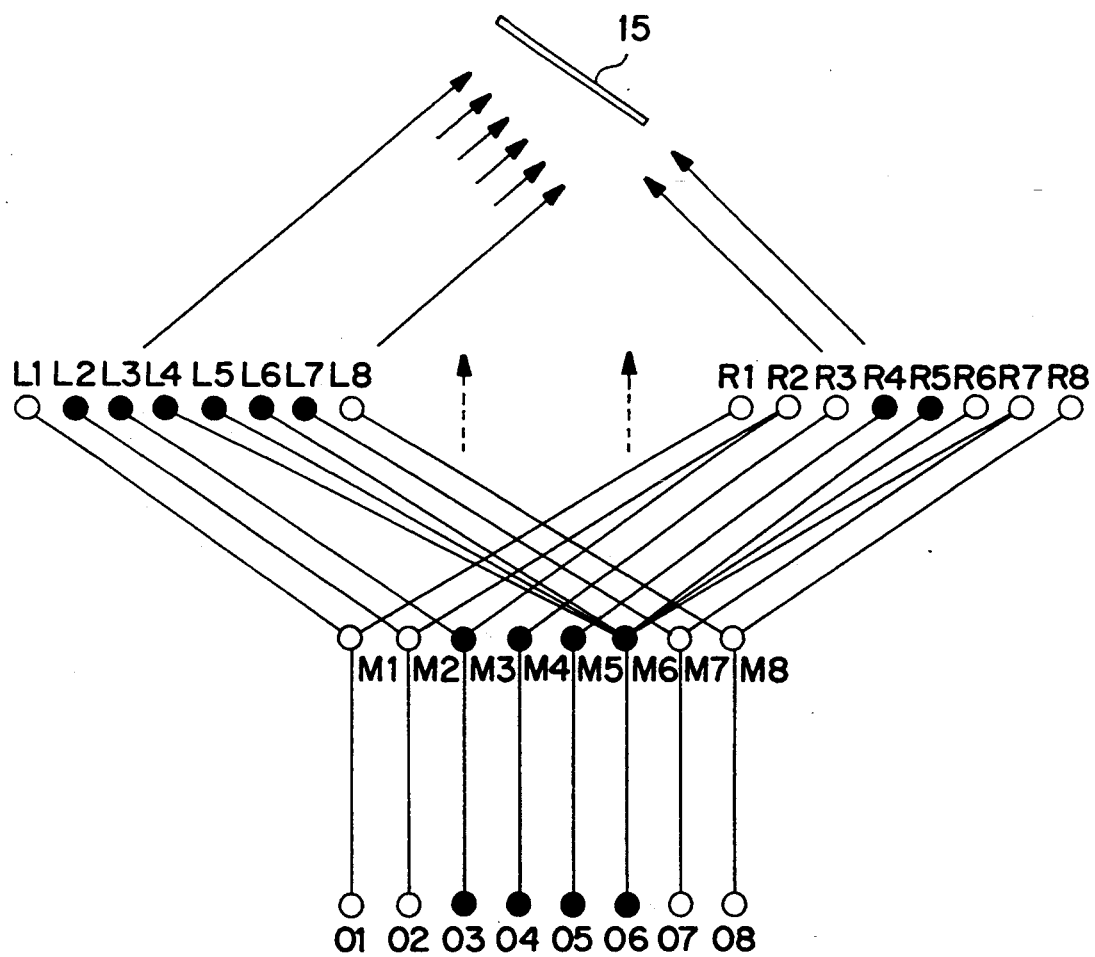
FIG. 7A and 7B is a view of a synthesized video image of board 15.

FIG. 7A and 7B shows a case where a board 15 is used as the object. For simplification, only eight elements worth of CCD picture elements to the right and left are covered and it is assumed that the synthesized video image is output by the perceptron model without learning. Namely, left and right neurons of the input layer are shown given the symbols L1 to L8 and R1 to R8, neurons of the hidden layer are shown given the symbols M1 to M8, and the neurons of the output layer are shown given the symbols O1 to O8, respectively. Also, the synaptic weight value Wij of a neuron Mi of the hidden layer logically has a value "1" with respect to six neurons in total, i.e., Li-1, Ri-1, Li, Ri, Li+1 and Ri+1 of the input layer, and has a value "0" with respect to the neurons of the other input layer.

In FIG. 7A, the neurons of the input layer corresponding to the picture elements which shoot the board 15 are indicated by the black dots " ", while the neurons which could not shoot it are indicated by the white dots "○". Also, all of the threshold values $\theta$ i of the hidden layer are set to the value "3", and all of the threshold values $\theta$ i of the output layer are "1". Also, the sigmoid function of the equation (3C) is a logical function defined to be a value approximating $\lambda \rightarrow 0$. "1" is output when $\Sigma$ Wij×vj−$\theta$ i exceeds "1", while "0" is output when it is not more than the value "1".

In the perceptron model set up in this way, the neurons L2, L3, L4, L5, L6, L7, R4, and R5 of the input layer corresponding to the picture elements shooting the board 15 output "1". By receiving the output signal vi of neurons of this input layer, the neuron M6 of the hidden layer performs a product sum operation of for example L4+L5+L6+R5+R6+R7=4 and outputs the value "1" since the result exceeds the value "3" of the threshold value $\theta$. The neuron Oi of the output layer makes only the value of the synaptic weight value Wij from the neuron Mi of the corresponding hidden layer "1", and makes the value of the synaptic weight value Wij from the neuron Mi of another hidden layer "0", and therefore the value of the neuron Mi of the corresponding hidden layer becomes as is the value of the neuron Oi of the output layer. As a result, as shown in the table of FIG. 7B, the modified synthesized video image signal obtained by shooting the board 15 from substantially the front is output from the neurons O3 to O6 of the output layer.

Moreover, the same processing can be carried out also in the vertical direction. In this case, another hidden layer having the same structure and same threshold value $\theta$ i as the hidden layers of M1 to M8 of FIG. 7A is provided with respect to the input layers L1 to L8 and R1 to R8, and the data is output from these two hidden layers M1 to M8 to the output layers O1 to O8. Then, the threshold value of the output layer is made "1" or "0". Further, it is also possible to add the input data of the input layer Li-1,j, Li,j, Li+1,j, Li,j-1, Li,j+1, Ri-1,j, Ri,j, Ri+1,j, Ri,j-1 and Ri,j+1 and, in addition to them, the input data of the input layer Li-1,j-1, Li+1,j-1, Li-1,j+1, Li+1,j+1, Ri-1,j-1, Ri+1,j-1, Ri-1,j+1 and Ri+1,j+1, and further, in addition to them, the input data of the input layer Li-2,j-2 to Li+2,j+2, Ri-2,j-2 to Ri+2,j+2, ... to the neuron Mi of the hidden layer of FIG. 7A. i indicates the coordinate in the horizontal direction, and j indicates the coordinate in the vertical direction. In this case, the threshold value $\theta$ i becomes "5", "9", "25", ....

By this, the video image data of the value of the greatest number among the values of a group of video image data of a certain picture element stored and picture elements near this picture element are selected and output.

Note that, it is also possible to perform weighting for the columns for every column of j, j-1, j-2, ... while varying the value of $\lambda$ of the sigmoid function of equation (3C). Other than this, if the processing data for the input data of three picture elements in the j column is equal to the threshold value $\theta$ i, it is also possible to perform the processing for input data of part or all of the picture elements around these three picture elements, and when also this processing data is still equal to the threshold value θ i, it is also possible to perform processing for the input data of the picture elements around this.

Also, in an example of color, the video image data stored in one neuron is stored also for cyan, magenta, and yellow other than black, and the above-described processing is carried out for each color. Further, in the case where the tone of the color is more than a 1-bit 2-stage of "0" and "1", for example, in the case of a 2-bit 4-stage of "00" to "11", 3-bit 8-stage of "000" to "111", . . . , the following is exhibited. Namely, the neuro-board of FIG. 7A described above is constituted for each bit of tone, and each neuro-processed bit is output for every neuro-board, and they are combined as one data. By this, among the values of the tones of the input data, a mode value sharing the largest part is selected and output. Next, a case of the back propagation (model) generally used in a neural network will be explained.

6. Video Image Signal Processing

Figure 8:
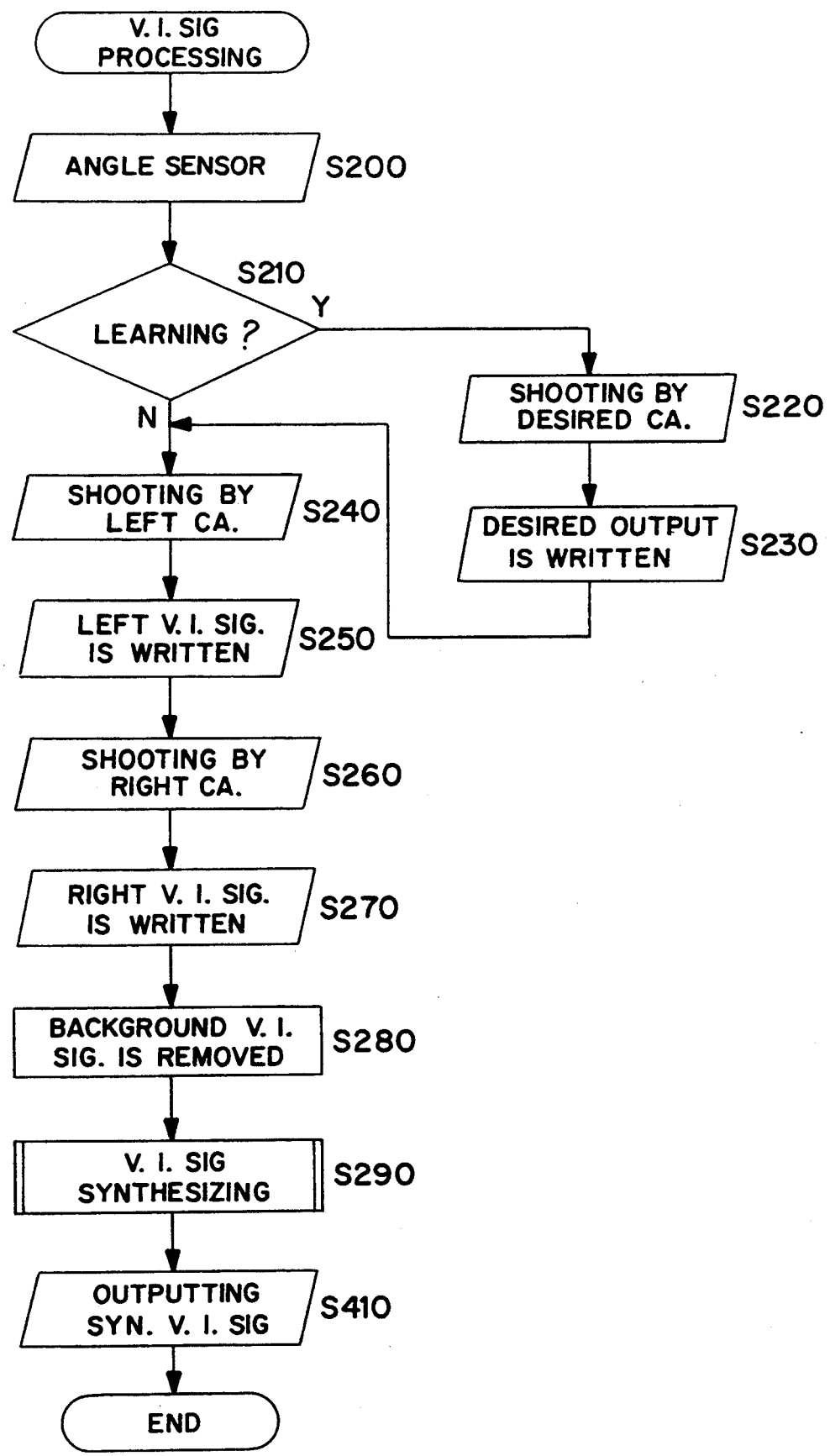
FIG. 8 is a flow chart of video image signal processing.
Figure 9:
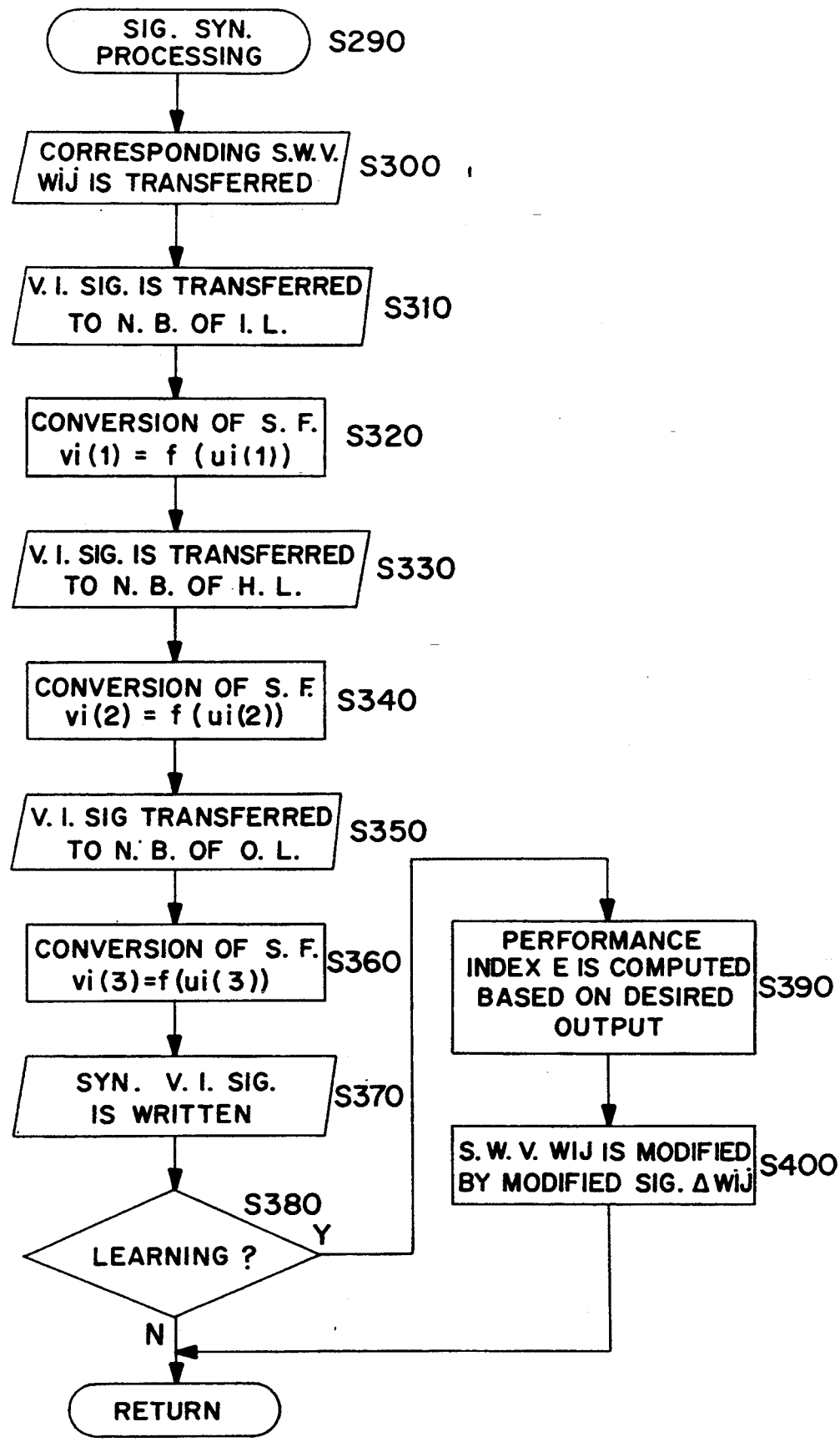
FIG. 9 is a flow chart of signal synthesizing processing.
Figure 10:
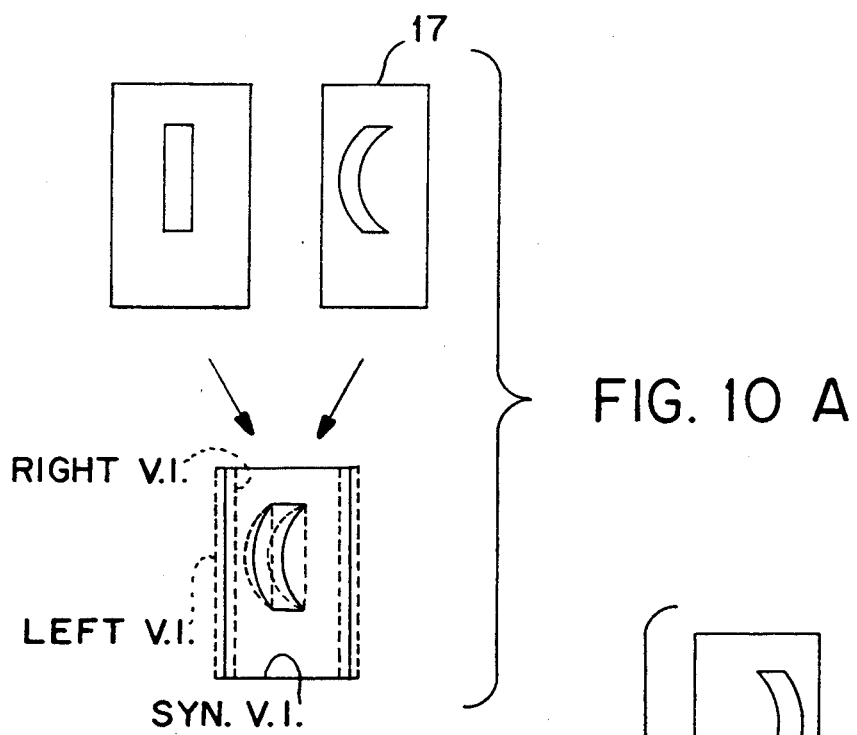
FIGS. 10A, 10B and 10C show video images of a board 17 with a handle turned 15 degrees to the left, facing straight to the front, and turned 15 degrees to the right, respectively.
FIGS. 10D, 10E and 10F show synthesized video images of the board 17 with a handle turned 15 degrees to the left, facing straight to the front.
Figure 10:
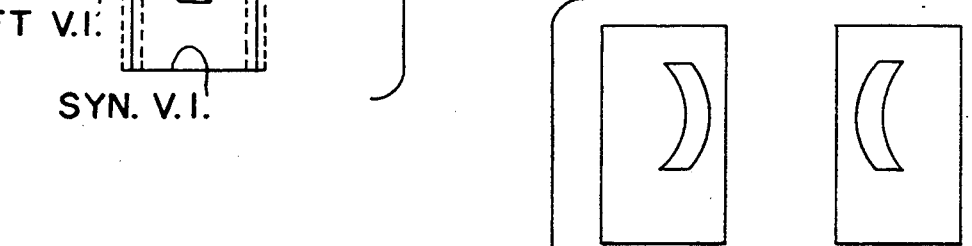
Figure 10:
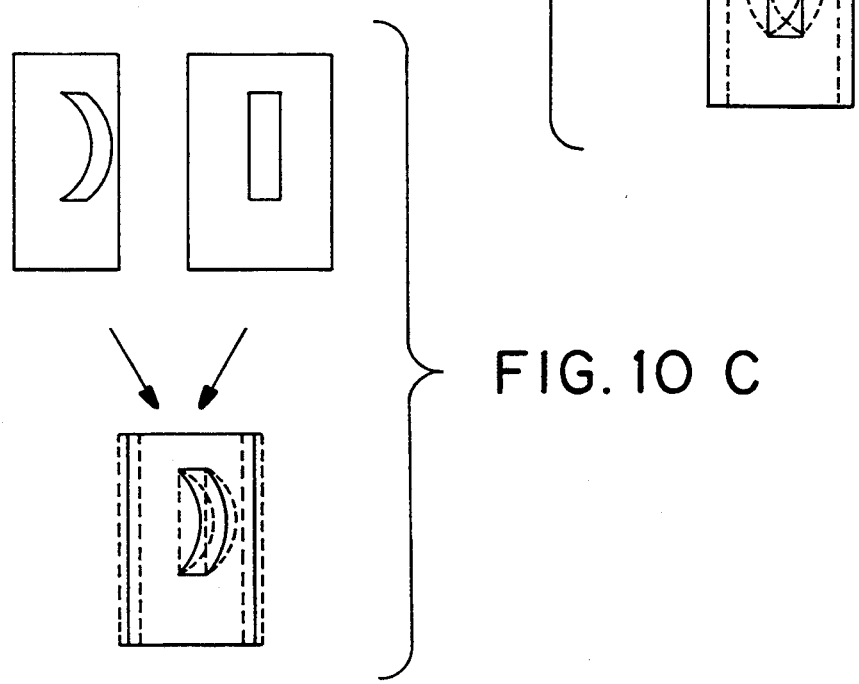

FIG. 8 is a flow chart of the video image signal processing. As shown in FIG. 10, in the present embodiment, a board 17 with a handle is used as the object. An example is shown in which this object is shot from a direction 15 degrees to the left, the front, and 15 degrees to the right. First, the positions (angles) of the cameras 62 and 64 are detected based on the data from the angle sensor 76 by the CPU 25 and stored (step S200). Next, the board 17 with the handle is shot by the camera 66 for learning, and the video image signal thereof is written as the desired output C via the bus line 32 in the video image signal memory region 37a of the RAM 37 (steps S210, S220, S230).

In the present embodiment, the data transfer is carried out via the bus line 32, but it is also possible to use DMA transfer releasing the bus or data transfer by channel control so as to improve the response. Next, two cameras 62 and 64 arranged at directions 15 degrees to the left and right with respect to the front of the board 17 with the handle are alternately or simultaneously activated, the board 17 with the handle is shot, and the video image signals A and B of the video images 17a and 17b are written in the video image signal memory region 37a of the RAM 37 (steps S240 to S270). Note that, as mentioned before, the background video image signals A0 and B0 obtained during a state where the board 17 with the handle was not present are stored in advance in the background signal memory region 37b, and therefore these background video image signals A0 and B0 are removed from the video image signals A and B, and the video image signals A and B of only the board 17 with the handle are extracted (step S280). The extracted video image signals A and B are rewritten in the video image signal memory region 37a of the RAM 37.

Next, the sub-routine (step S290) of the signal synthesizing processing is executed using the extracted video image signals A and B. In this sub-routine, the synaptic weight value Wij shown in FIG. 6 is read out from the synaptic weight value table 73 by the CPU 25 and transferred via the bus line 32 and I/O interfaces 49a, 49b, and 49c to the shift registers 92 and 122 of the neuro boards 52, 53, and 54 (step S300), respectively. Further, the left and right video image signals A and B stored in the video image signal memory region 37a of the RAM 37 are read out and transferred via the bus line 32 and I/O interface 49b to the latch 121 of the neuro-board 52 of the input layer for each picture element (step S310).

In the neuro-board 52, as mentioned before, the data vi for each picture element input to each latch 121 is subjected to a product sum processing and threshold value processing, and that processing data ui(1) is stored in the latch 129. The data ui(1) of the latch 129 is transferred to the RAM 37 by the CPU 25, and further the sigmoid conversion indicated in the aforementioned equation (3C) is carried out based on the sigmoid function table 74 (step S320). It is also possible even if the conversion of the sigmoid function is the computation of the operation equation (3C) by the CPU 25. If it is a value in a limited range as in the present embodiment, it is also possible even if the conversion value is stored in a table and read out at a high speed.

Next, the data vi(2) sigmoid-converted by the CPU 25 are sequentially transferred to the respective latches 91 of the neuron-board 53 of the hidden layer (step S330). The transferred data vi(2) is subjected to the product sum operation and threshold value processing and similarly temporarily stored in the respective latches 99. Similarly, the sigmoid-converted data vi(3) is transferred to the respective latches of the neuro-board 54 of the output layer and similar processing is repeated (steps S340, S350, S360). In this way, as the output expectation value, the data vi(3) from the respective neurons of the output layer are stored in the synthesized signal memory region 37c of the RAM 37 (step S370).

Subsequently, a performance operation during learning is carried out by the CPU 25. In the performance operation based on the back propagation model, the video image signal C of the object shot using the camera 66 is used as the data v'i(3) of the desired output, and the synaptic weight value Wij of the respective neurons is learned. In the performance operation, the degree of coincidence between the data vi(3) as the output expectation value and the data v'1(3) as the desired output is evaluated, and the synaptio weight value Wij is modified in accordance with the result thereof. Namely, the respective synaptic weight values Wij are computed so that, the next performance index E defined as the square error of the data vi(3) with respect to the data v'i(3) of the desired output C converges to the minimum value:

$$E = \tfrac{1}{2} \Sigma \, (v'i(k) - vi(k))^2 \tag{6A}$$

In the execution of this operation, the synaptic weight value Wij(2) of the neuron of the hidden layer is modified subsequent to the synaptic weight value Wij(3) of the neuron of the output layer, and the equation in the learning rule is as follows:

$$\Delta Wij(k) = \eta \, \gamma \, i(k) vj(k)$$

$$\gamma \, i(3) = (v'i(3) - vi(3)) \, f'(ui) \tag{6B}$$

$$\gamma \, i(k) = (\Sigma \, Wij(k+1) \times \gamma \, j(k+1)) \, f'(ui \, (k)) \tag{6C}$$

Here, η is the learning parameter determining the speed of convergence. γ i(k) is represented by equation (6B) where the k layer is the output layer (3), while by equation (6C) where the k layer is the hidden layer other than the output layer. It is seen that the modified signal ΔWij(k) in the back propagation (model) is recurrently calculated from the modified signal ΔWij(k+1) of the previous layer against the flow of the signal. f'(ui(k)) is the derived function of the sigmoid function.

In accordance with the modified signals (rate) ΔWij(3) and ΔWij(2) of the output layer and hidden layer learned by this performance operation, the synaptic weight value Wij stored in the synaptic weight value table 73 is modified. The evaluation of the synaptic weight value Wij is carried out so as to minimize the performance function of the aforementioned equation (6A). The amount of modification ΔWij of the synaptic weight value is computed according to the aforementioned equations (6B) and (6C). The amount of change ΔWij of the synaptic weight value computed is added to Wij of the synaptic weight value table 73 by the CPU 25, which is rewritten.

When one round of the modification of the synaptic weight value table 73 is ended in this way, the learning is terminated, and the processing returns to the main routine (steps S380, S390, S400). On the other hand, at the time of no learning, the data vi(3) serving as the output expectation value from the respective neurons of the output layer are written into the synthesized signal memory region 37c of the RAM 37, and the processing returns to the main routine. In the main routine, irrespective of whether it was during the learning, the synthesized video image signal vi(3) stored in the RAM 37 is displayed on the CRT 45 (step S410).

At this time, it is also possible to transfer the synthesized video image signal vi(3) via the modem 48 and the telephone line to another video image processing apparatus. Also, when the first video image signal processing routine is ended, the effect of learning is enhanced by the repetition of the video image signal processing routine. The number of times of repetition of this learning can be decided from the video image of the board 17 with the handle displayed on the CRT display device 45 or can be set up in advance to a predetermined number of times. When the learning is ended in this way, it becomes possible to modify and synthesize the synthesized video image at the pseudo camera position just by the video image signals A and B from the two cameras 62 and 64 even if the camera 66 is removed.

FIGS. 10A, 10B, and 10C show synthesized video images where the board 17 with the handle is placed turned 15 degrees to the left, facing straight forward, and turned 15 degrees to the right. The synthesized video images for the board 17 with the handle placed turned 15 degrees to the left, facing straight forward and turned 15 degrees to the right are shown respectively in FIGS. 10D, 10E and 10F. Also, where the object is not the board 17 with a handle, but the contour of a face of a man, as shown in FIG. 11, when the video image 16a of the contour of the face shot from the camera 62 in the left direction and the video image 16b of the contour of the face shot from the camera 64 in the right direction are indicated by solid lines, the video image 16c of the contour of the face to be synthesized is obtained as indicated by a dotted line.

7. Second Embodiment

Figure 13:
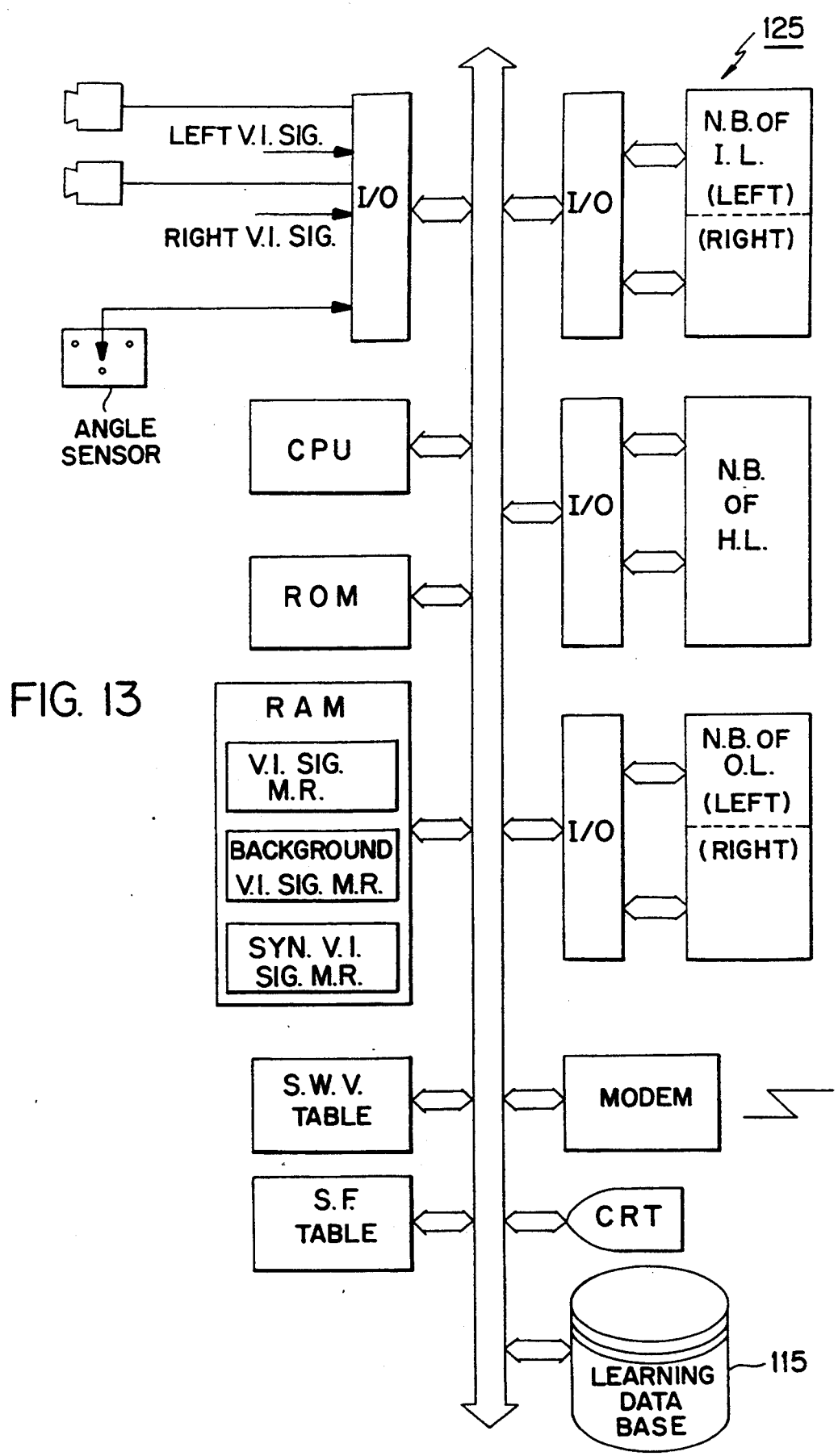
FIG. 13 is a block diagram of the configuration of a video image synthesizing apparatus 125 of a modification of the embodiment.

FIG. 13 shows a video image synthesizing apparatus 125 of a second embodiment. In this video image synthesizing apparatus 125, the camera 66 is arranged at the pseudo camera position at which the synthesis is to be carried out, and a learning data base 115 in which a large number of video images shot by the camera 66 is newly provided. In this learning data base 115, also the synaptic weight value Wij when the learning is executed using the video images shot by the cameras 62 and 64 from the directions 15 degrees to the left and right and the video image signals at various angles shot by the camera 66 as the desired outputs is stored. Accordingly, the learning work is ended by only a transfer of the synaptic weight value Wij from this learning data base 115 to the respective neuro-boards 52, 53, and 54.

The present invention is not restricted to the above-described embodiments and can be modified in various ways within a range not exceeding the gist of the present invention. For example, it is also possible for the present invention to use a digital neuro chip 70 performing also the sigmoid conversion processing shown in FIG. 12. In this neuro chip 70, the output value 72 from another neuron is received via the interface 75, and the product sum operation is applied by the multiplier 76 and the adder 77 using the synaptic weight value Wij stored in the synaptic weight value table 73, and then the processing up to the conversion of the sigmoid function 78 is carried out. In this way, the processing up to the sigmoid conversion is carried out in the chip, whereby the load of the CPU 25 can be reduced.

Also, the video image of a one-dimensional pseudo camera position in which only left and right angles are different is synthesized in the present embodiment, but it is also possible even if the video image of a two-dimensional pseudo camera position including also the vertical direction is synthesized. In this case, the number of the cameras, 62, 64, etc. becomes three or more, and the synthesizing and modification processing is carried out from the respective video images. The angles from the fronts of the cameras 62 and 64 are desirably the same between the left and right, but it is also possible even if they differ. In this case, the synaptic weight values Wij on the left and right differ.

Further, the distances of the cameras 62 and 64 from the object are desirably the same, but it is also possible even if they are different. In this case, the proportional conversion in accordance with the ratio of the above-described distances is carried out so that the size of the video image from one camera coincides with the size of the video image from another camera. When the object is horizontally symmetrical, either one of the cameras 62 and 64 is used, and it is also possible even if the video image obtained by horizontally inverting the video image of one camera is used for the video image of another camera. Any of a still picture and moving picture can be adopted as the video image data to be subjected to the synthesizing and modification processing.

Also, further the neuron layer of the hidden layer in the present embodiment comprises one stage, but it is also possible even if it comprises 2 or more stages. Also, each neuron may be a virtual neuron programmed by a programming language such as a C language with respect to a Neumann computer, i.e., there being no board or chip at all other than some neuro-boards. Further, it is also possible even if the method of learning is the "learning had performance record" or "self organization" method other than learning with a teacher.

Moreover, the center of the object was positioned at the intersection of the center lines of the optical systems of the respective cameras 62 and 64, but it is also possible even if it is positioned at a location deviated from this intersection. Note that, it is also possible even if also the center lines of the optical systems of the cameras 62 and 64 move toward the center of the object if the object moves. In this case, the directions of the cameras 62 and 64 can be changed by the operators or a sensor. This sensor is a sensor detecting the movement of an entire video image data shot by an infrared ray camera or cameras 62 and 64 or other sensors.

I claim:

1. An apparatus for combining a plurality of video images comprising:
    at least one camera means, which is arranged at a camera position away from an object, for photographing video images of the object;
    video image data generation means, coupled to said at least one camera means, for generating a plurality of video image data of different camera positions for the object based on the video images photographed by said at least one camera means;
    video image data memory means for storing the plurality of video image data generated by said video image data generation means;
    video image data read out means for reading out the plurality of video image data stored in said video image data memory means;
    coefficient data memory means for storing coefficient data for modifying and synthesizing video image data of a pseudo camera position between different camera positions from the plurality of video image data of the different camera positions read out by said video data read out means;
    coefficient data read out means for reading out the coefficient data stored in said coefficient data memory means; and
    video image data modifying and synthesizing means, coupled to said video image data read out means and said coefficient data read out means, for modifying and synthesizing video image data of the pseudo camera position from the plurality of video image data of the different camera positions, based on the coefficient data read out by said coefficient data read out means.

2. The apparatus for combining a plurality of video images as set forth in claim 1, wherein said video image data modifying and synthesizing means selects and outputs the video image data having a greatest number value from among values of a group of video image data of a certain picture element stored in said video image data memory means and picture elements near the certain picture element.

3. The apparatus for combining a plurality of video images as set forth in claim 2, wherein said coefficient data memory means stores a synaptic weight value and a threshold value for selecting the video image data having the greatest number value.

4. The apparatus for combining a plurality of video images as set forth in claim 3, wherein said video image data modifying and synthesizing means comprises a neural network, each synaptic weight value is preliminarily obtained by learning using the plurality of video image data of the different camera positions as an input and the video image data of the pseudo camera position as an output expectation value.

5. The apparatus for combining a plurality of video images as set forth in claim 1, wherein said at least one camera means comprises a plurality of camera means, the object being positioned at an intersection of optical system center lines of said plurality of camera means.

6. The apparatus for combining a plurality of video images as set forth in claim 1, wherein said at least one camera means comprises a plurality of camera means which are arranged at equal distances from the object.

7. The apparatus for combining a plurality of video images as set forth in claim 1, wherein said camera means comprises a plurality of camera means which are arranged at equal angles in front of the object.

8. The apparatus for combining a plurality of video images as set forth in claim 1, wherein said video image data modifying and synthesizing means breaks down the plurality of video image data of the different camera positions into a plurality of colors and modifies and synthesizes the video image data of the pseudo camera position for each color.

9. The apparatus for combining a plurality of video images as set forth in claim 1, wherein said video image data modifying and synthesizing means modifies and synthesizes each bit of the video image data indicating tone of the plurality of video image data of the different camera positions.

10. A method of combining a plurality of video images comprising:
    (a) photographing video images of an object from different camera positions apart from the object;
    (b) generating a plurality of video image data for the different camer positions of the object based on the video images photographed during said step (a);
    (c) storing the plurality of video image data generated during said step (b);
    (d) reading out the plurality of video image data stored during said step (c);
    (e) storing coefficient data for modifying and synthesizing video image data of a pseudo camera position between the different camera positions from the plurality of video image data of the different camera positions readout during said step (d);
    (f) reading out the coefficient data stored during said step (e); and
    (g) modifying and synthesizing the video image data of the pseudo camera position from the plurality of video image data of the different camera positions based on the coefficient data read out during said step (f).

11. The method of combining a plurality of video images as set forth in claim 10, wherein said step (g) comprises selecting and outputting the video image data having a greatest number value from among values of a group of video image data of a certain picture element and picture elements near the certain picture element stored during said step (c).

12. The method of combining a plurality of video images as set forth in claim 11, wherein said step (e) comprises storing a synaptic weight value and a threshold value for selecting the video image data having the greatest number value.

13. The method of combining a plurality of video images as set forth in claim 12, wherein said step (g) comprises learning in advance, using a neural network, each synaptic weight value using the plurality of video image data of the different camera positions as input and the video image data of the pseudo camera position as an output expectation value.

14. The method of combining a plurality of video images as set forth in claim 10, wherein said step (a) comprises photographing video images at the different camera positions, the object being positioned at an intersection of optical system center lines of the different camera positions.

15. The method of combining a plurality of video images as set forth in claim 10, wherein said step (a) comprises photographing video images at the different camera positions which are positioned at equal distances from the object.

16. The method of combining a plurality of video images as set forth in claim 10, wherein said step (a) comprises photographing video images at the different camera positions which are positioned at equal angles in front of the object.

17. The method of combining a plurality of video images as set forth in claim 10, wherein said step (g) comprises breaking down the plurality of video image data of the different camera positions into a plurality of colors and modifying and synthesizing the video image data of the pseudo camera position for each color.

18. The method of combining a plurality of video images as set forth in claim 10, wherein said step (g) comprises modifying and synthesizing each bit of the video image data indicating the tone of the plurality of video image data of the different camera positions.

* * * * *